Dec. 22, 1942.　　　　　K. MARSH　　　　　2,306,133
ARTICLE CHARGING APPARATUS
Filed April 23, 1940
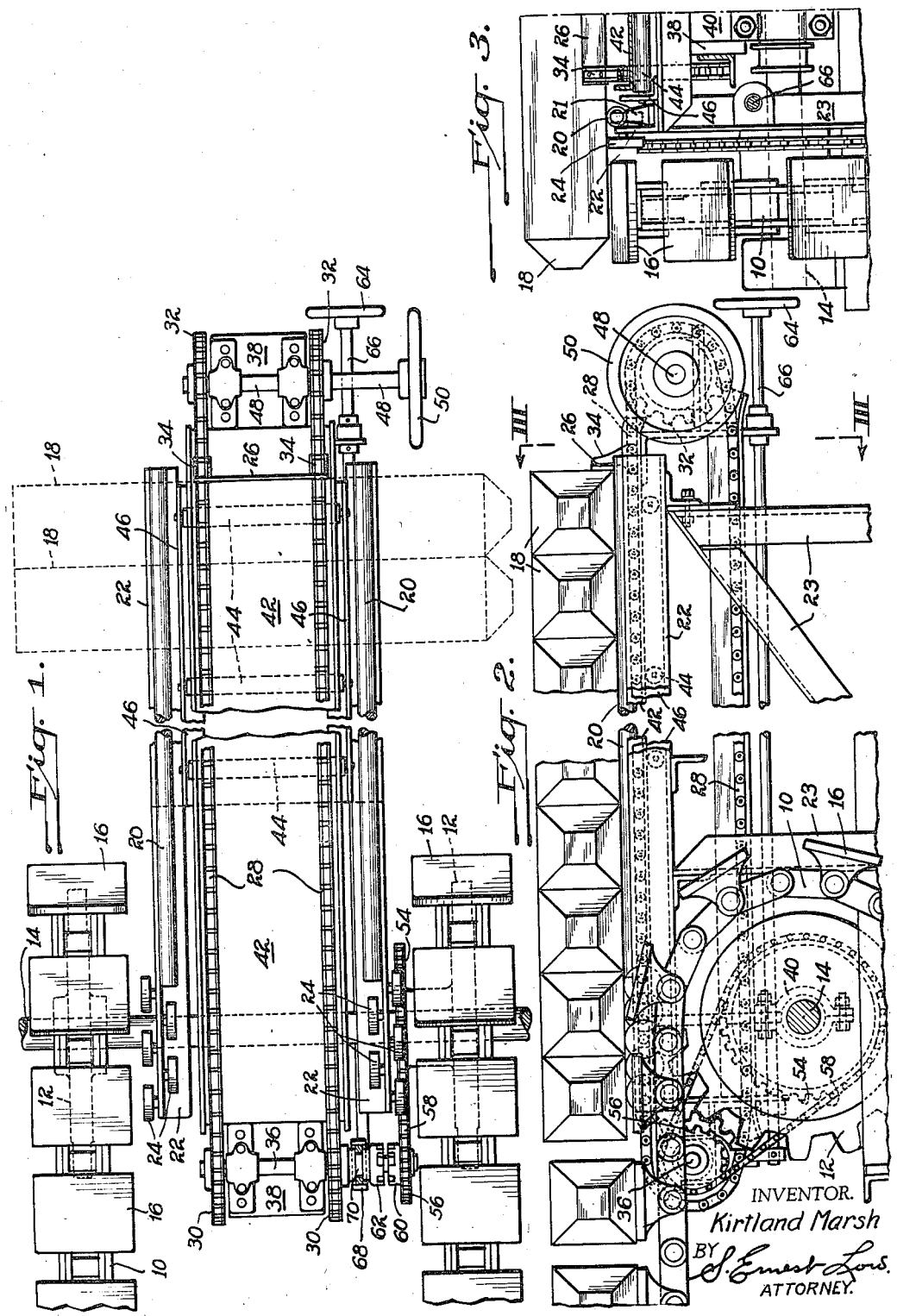
INVENTOR.
Kirtland Marsh
BY S. Ernest Lois
ATTORNEY.

Patented Dec. 22, 1942

2,306,133

UNITED STATES PATENT OFFICE 2,306,133

ARTICLE CHARGING APPARATUS

Kirtland Marsh, Pittsburgh, Pa., assignor to Aluminum Company of America, Pittsburgh, Pa., a corporation of Pennsylvania Application April 23, 1940, Serial No. 331,144

6 Claims. (Cl. 198—34)

This invention relates to article charging apparatus. It relates particularly to an apparatus for transferring articles from a charging position onto a conveyor.

Since the invention finds its greatest utility in charging articles onto an endless chain type of conveyor in such manner that the articles are spaced in predetermined relation, the invention will be generally described in connection with its applicability to the charging of articles onto such a conveyor. Conveyors of this type are often employed in furnaces for preheating articles such as billets for rolling and like processes. But the invention is not limited to the charging of articles onto any particular type of conveyor, whether used in connection with a furnace or not.

A preferred form of the invention includes the combination with a furnace conveyor of an article supporting table extending in front of the conveyor, and a pusher adapted to be driven by or independently of the conveyor to move articles on the table into contiguous or associated relation and thereafter to push the articles from the table onto the conveyor one-by-one.

In view of the adaptability of the invention to the transfer of articles onto a conveyor as described, it is one of the objects of the invention to provide novel apparatus for charging articles onto a conveyor, and particularly for so charging articles in predetermined spaced relation thereon.

Another object of the invention is to provide apparatus for receiving a plurality of articles to be transferred to a conveyor, the apparatus being adapted to associate the articles together and then charge the articles onto a conveyor. Another object is to provide charging apparatus adapted to be operated, independently of a conveyor, for inter-associating articles and yet adapted to be driven from a conveyor for charging the articles onto the conveyor.

Other objects and advantages of the invention which may be taken either singly or in combination include the provision of disconnectible means for driving a conveyor charging apparatus from a conveyor, means for driving a conveyor charging apparatus at a speed lower than the speed of a conveyor, means for driving a conveyor charging apparatus in predetermined speed relationship corresponding to the movement of a conveyor whether continuous or interrupted, and means for driving a conveyor charging apparatus in either direction independently of the operation of a conveyor. Other objects and advantages of the invention will appear upon reading of the following description in connection with the drawing and on reference to the appended claims.

In the drawing:

Figure 1 is a plan view of a conveyor and charging apparatus therefor, showing in dotted lines positions at which articles to be charged may be supported by the charging apparatus;

Figure 2 is a partial side elevation of the conveyor and charging apparatus of Figure 1, showing a plurality of articles on the conveyor and charging apparatus; and Figure 3 is an end view of the left half of the apparatus of Figures 1 and 2, the view having been divided at the center line thereof, and the omitted portion of Figure 3 being similar to that shown.

Referring to the drawing, the embodiment of the invention chosen for description is seen to comprise a pair of endless conveyor chains 10 spaced from each other in side-by-side relationship, and charging apparatus therefor, now to be described. The conveyor chains 10 here shown constitute a furnace conveyor in a billet preheating furnace such as is used to heat rod mill billets to hot rolling temperatures, but the invention is not limited to the charging of billets to a furnace conveyor since it is equally applicable to the charging of articles generally to conveyors for carrying such articles through any processing operations.

The conveyor chains 10 are shown supported on and in engagement with two conveyor chain sprockets 12 suitably secured to a shaft 14, which shaft is supported in bearings not shown. The conveyor chains 10 may be driven through the application of motive forces through the shaft 14, but as will appear hereinafter, it is preferable to drive the conveyor chains through the drive shaft and sprockets at the other end thereof which is not here shown. Each conveyor chain 10 is suitably provided at spaced intervals with a plurality of article receiving shoes 16 upon which articles such as billets 18 may be supported, each billet 18 when transferred to chains 10 preferably being supported by a shoe 16 on each chain 10, though it may extend over or rest on more than one shoe 16 of each chain 10.

A suitable article supporting table comprising spaced bars 20 disposed in parallel relation to the axis or longitudinal center line of the conveyor chains 10, and supported on base members 21 on angles 22 secured to main frame 23, is provided from which articles, such as billets 18, may be charged onto conveyor chains 10. The table further includes, at the portion thereof between the conveyor chain sprockets 12, a plurality of article supporting rollers 24 mounted on angles 22 and forming extensions of the bars 20. The bars 20 and rollers 24 form an article supporting slide, way, or table for the billets 18 which slide, way, or table extends between the conveyor chains 10 and overlaps the same for a short distance in the direction of the body thereof, but mainly extends in front of the conveyor chains 10, to the right as viewed in Figures 1 and 2. The charging table comprised of the bars 20 and rollers 24 is preferably mounted at an elevation slightly above the elevation of the upper traverse of shoes 16 on the conveyor chains 10 so as to support the billets 18 thereabove.

As will now be described, the billets 18 may be moved along the bars 20 and the rollers 24, by sliding and rolling respectively, onto shoes 16 of conveyor chains 10. Apparatus for effecting this movement of the billets 18 comprises a pusher 26 movable along the charging table toward and away from the main portion of the conveyor chains 10 by means of a pair of endless pusher chains 28 supported on suitable sprockets 30 and 32. Pusher 26 comprises a plate, to which reference numeral 26 is directed, secured above each pusher chain 28 by means of a suitable bracket 34 forming a link in each said chain.

The pair of sprockets 30 supporting the pusher chains 28 at the end thereof adjacent the conveyor chains 10 are mounted on a shaft 36 supported in bearings carried by a frame 38, the said frame 38 being supported by brackets 40 on the conveyor chain sprocket shaft 14. The frame 38 includes the upper and lower chain troughs 42 for the pusher chains 28 and is supported throughout the portion extending in front of the conveyor chains 10 on a plurality of rollers 44 rotatably secured in angles 46 in the main frame 23.

The pair of pusher chain sprockets 32 located in front of the conveyor chains 10 are mounted on a shaft 48 held in bearing relationship to a portion of the frame 38 extending in front of the charging table, to the right as viewed in Figures 1 and 2. The construction hereinabove referred to for supporting the frame 38 on the shaft 14 and main frame 22 will be referred to in particular hereinafter.

From the above description it will appear that the pusher 26 for moving articles such as billets 18 along the bars 20 and rollers 24 is adapted to be moved toward or away from the body of the conveyor chains 10 in response to the movement of the upper traverse of the pusher chains 28 in either direction. The shaft 48 supporting the pusher chain sprockets 32 in front of the charging table is provided with a suitable hand wheel 50 whereby the pusher chains 28 and pusher 26 may be operated at will to preliminarily position the billets 18, or to return the pusher 26 to the position shown in the drawing after it has completed a traverse to the opposite end of the charging table. It is also possible to use the above-described apparatus without employing the further means for driving the pusher chains 28 to be hereinafter described, in which case the pusher 26 and pusher chains 28 would be operated entirely by means of the hand wheel 50.

For drivingly connecting the conveyor chains 10 with the pusher chains 28 so as to operate the pusher 26 in direct relation to the movement of the conveyor chains 10, there is provided an auxiliary sprocket 54 on the shaft 14 of the main conveyor. A corresponding sprocket 56 is located on the shaft 36 supporting the pusher chain sprockets 30 adjacent to the end of the conveyor chains 10. A suitable endless chain 58 connects the sprockets 54 and 56 so as to drive the sprocket 56 in step with the motion of the conveyor chains 10.

The aforementioned sprocket 56 is rotatably free of the shaft 36, being secured against end removal therefrom by any suitable retaining means. Formed preferably integrally with the sprocket 56 is a clutch disc 60 adapted to be cooperatively engaged with a clutch disc 62, secured to the shaft 36 against rotation with respect thereto, but free for axial movement with respect thereto. It will appear that driving force is imparted by chains 10 to the pusher chains 28 when engagement is made between the clutch discs 60 and 62. The clutch disc 62 is adapted to be moved into and out of engagement with the clutch disc 60 by operation of a hand wheel 64 on a shaft 66 supported in frame 38 and connected to a yoke 68 in engagement with a collar 70 of the clutch disc 62. It will appear that slight rotation of the hand wheel 64 in either direction will move the clutch disc 62 axially of the shaft 36 for the purpose of engaging or disengaging the same with or from the clutch disc 60 on the sprocket 56.

The frame 38 has been secured to the shaft 14 and supported by rollers 44 in main frame 23 so as to permit movement of the conveyor chain sprockets 12 to adjust the tension in the conveyor chains 10. Thus, it will appear that any movement of the conveyor chain sprockets 12 to the left or to the right as viewed in Figures 1 and 2 may be accomplished without interference with the main frame 23, the frame 38 supporting the pusher chains 28 and sprockets 30 and 32 therefor being free for movement with respect to the main frame 23. Since it is desirable to provide for the adjustment of the tension of the conveyor chains 10 in this manner, it may be preferable to drive the conveyor chains 10 through the shaft and sprockets therefor at the other end thereof, not here shown. However, with the provision of suitable universal couplings, the driving apparatus could be associated with conveyor chain sprocket shaft 14.

The preferred apparatus of the invention having been above described, its operation may now be set forth. With the pusher 26 located in retracted position near the front of the charging table as illustrated in Figures 1 and 2, a plurality of billets 18 may be placed across the bars 20 and rollers 24. The loading of the charging table in this manner usually results in an irregular spacing of the billets 18 with respect to each other. Before instituting the process of transferring the billets from the charging table to the conveyor chains 10, it is preferable to assemble or interassociate the billets so that they are contiguously positioned in the manner illustrated in the drawing, and so that they are in parallel relation, perpendicular to the axis of the conveyor chains 10. To accomplish this positioning of the billets 18, the hand wheel 50 may be operated to drive the pusher chains 28 and the pusher 26 to move the billet 18 nearest the pusher 26, and successively each billet into which the preceding billet is brought into contact, into the preferred contiguous parallel relation. This operation of the pusher 26 by the hand wheel 50 need not cause the movement of the last billet 18 resting on the rollers 24 onto the conveyor chains 10. When it is desired, however, to continue to charge the conveyor chains 10 with billets 18, the pusher 26 may be further operated manually.

After positioning the billets 18 in the preferred arrangement illustrated in Figure 2 of the drawing, the hand wheel 64 is then preferably operated to engage the clutch discs 60 and 62 so that the further movement of the pusher 26 is effectuated by means of the driving connection thereof with the conveyor chains 10. Thereafter the pusher 26 will move at a rate proportional to the rate of movement of the conveyor chains 10 and will effect a charging of the billets 18 one-by-one from the rollers 24 to the shoes 16 of the conveyor chains 10. The sprockets 54 and 56 having been properly proportioned, the billets 18 will be spaced one from another on the conveyor chains 10 at any desired distance.

In the normal use of the apparatus of the invention, the conveyor chains 10 operate at a rather slow speed. Thus, when the last of the billets 18 on the bars 20 and rollers 24 has been deposited on the conveyor chains 10, the clutch discs 60 and 62 may be separated by operation of the hand wheel 64, and the pusher 26 may be returned to its retracted position, at which point the cycle of operations may be reinstituted in the manner just described. Thus, a new load of billets 18 may be lowered onto the bars 20 and rollers 24 by a suitable tongs, and the charging thereof to the conveyor chains 10 may be reinstituted in the same manner as has been described.

One form of the invention having been specifically described, it is pointed out that numerous modifications thereof may be constructed without departing from this invention as set forth in the claims appended hereto.

What is claimed is:

1. In an apparatus of the class described, at least one endless chain forming an article conveyor, an article charging way partially overlapping said conveyor for supporting articles to be transferred thereto, an article pusher in association with said way and mounted on an endless drive means, means associated with said endless drive means for moving said pusher toward said conveyor to interassociate articles on said way, further means for moving said pusher toward said conveyor to transfer articles on said way one-by-one to said conveyor, and means for drivingly connecting said last named moving means to said conveyor.

2. In an apparatus of the class described a pair of endless conveyor chains disposed in spaced side-by-side relationship to form an article conveyor, an article charging table disposed between said conveyor chains and extending axially and beyond the extremities thereof for supporting articles adjacent thereto, an article pusher in association with said table and mounted on an endless drive means, means associated with said endless drive means for moving said pusher toward said conveyor chains to inter-associate articles on said table, further means associated with said endless drive means for moving said pusher toward said conveyor chains to transfer articles on said table one-by-one to said conveyor chains, and speed reducing means for drivingly connecting said last named moving means to said conveyor chains, whereby articles may be transferred from said table to said conveyor chains in predetermined spaced relation.

3. In an apparatus of the class described, an article conveying means, an article supporting means partially overlying said conveying means and adapted to support articles to be transferred to said conveying means, an article advancing means associated with said supporting means, means for actuating said advancing means to inter-associate articles on said supporting means, further means for actuating said advancing means to transfer articles one-by-one from the supporting to the conveying means, and means for drivingly connecting the last mentioned actuating means with means actuating said conveying means.

4. In an apparatus of the character described, an article conveying means, a stationary article supporting means partially overlying said conveying means and adapted to support articles to be transferred to said conveying means, an article pushing means associated with said supporting means, manually operable means for actuating said pushing means to inter-associate articles on said supporting means, mechanically operable means for actuating said pushing means to transfer articles one-by-one from the supporting to the conveying means, and means for drivingly connecting the last mentioned pushing means with means actuating said conveying means.

5. In an apparatus of the class described, a conveyor, means for supporting articles adjacent said conveyor, means for moving articles on said supporting means, means for driving said moving means rapidly to collect and align contiguously on said supporting means a plurality of irregularly spaced articles for transfer to said conveyor, and alternating means for driving said moving means in common driving relation with said conveyor to transfer the aligned articles one by one to said conveyor.

6. In an apparatus of the class described, a conveyor, means for supporting articles adjacent said conveyor for transfer thereto, means for advancing articles on said supporting means, and selective means for driving said advancing means, one of said selective means being adapted to arrange rapidly a plurality of irregularly spaced articles into a contiguous aligned train on said supporting means, another of said selective means being adapted thereafter to advance the train to transfer to said conveyor the article next adjacent thereto, said last mentioned means being drivingly associated with said conveyor.

KIRTLAND MARSH.

CERTIFICATE OF CORRECTION.

Patent No. 2,306,133.  December 22, 1942.

KIRTLAND MARSH.

It is hereby certified that error appears in the printed specification of the above numbered patent requiring correction as follows: Page 3, second column, line 47, claim 5, for "alternating" read --alternate--; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.